United States Patent
Kato et al.

(10) Patent No.: US 7,566,372 B2
(45) Date of Patent: Jul. 28, 2009

(54) RAILWAY CAR WHEEL

(75) Inventors: Takanori Kato, Amagasaki (JP);
Masahide Umino, Nara (JP); Tomoaki Yamamoto, Nishinomiya (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 8 days.

(21) Appl. No.: 11/128,323

(22) Filed: May 13, 2005

(65) Prior Publication Data

US 2005/0268995 A1    Dec. 8, 2005

(30) Foreign Application Priority Data

May 14, 2004    (JP)    ............... 2004-145115

(51) Int. Cl.
    *C22C 38/22*    (2006.01)
(52) U.S. Cl. ........................ 148/334; 420/105
(58) Field of Classification Search ............... 148/581, 148/583, 333, 320, 334; 75/123; 420/105
    See application file for complete search history.

(56) References Cited

U.S. PATENT DOCUMENTS 2,029,819 A * 2/1936 Frank et al. ............... 295/30
4,230,488 A * 10/1980 Heller et al. ............... 420/84
5,533,770 A * 7/1996 Clausmeyer et al. ........... 295/1
6,783,610 B2 * 8/2004 Shirley et al. ............... 148/334

FOREIGN PATENT DOCUMENTS

JP    358093857    *    6/1983    ............... 295/11
JP    2000-345295    12/2000

OTHER PUBLICATIONS

ASM International, Materials Park, Ohio, Metallograper's Guide: Practices and Procedures for Irons and Steels, Chapter 1, "Introduction to Steels and Cast Iorns", Table 1.1, p. 3, 1999.*
Engish abstract of Russian patent 575374, Esaulov, AT et al, Oct. 22, 1977.*
Vorobeva et al, Steel 38Kh2NM, translated from Metallovedenie I Termicheskaya Obrabotka Metallov, No. 4, pp. 16-20, Apr. 1990, pp. 251-255.*

* cited by examiner

*Primary Examiner*—Zroy King
*Assistant Examiner*—Jie Yang
(74) *Attorney, Agent, or Firm*—Clark & Brody

(57) ABSTRACT

A railway car wheel comprises a rim having a flange and a tread portion. The tread portion contains 0.35-0.55% C and has a Vickers hardness of at least 360 and comprises a bainite structure, a tempered martensite structure, or a mixture of both.

8 Claims, 3 Drawing Sheets

RAILWAY CAR WHEEL

BACKGROUND OF THE INVENTION

This invention relates to a railway car wheel and particularly to a railway car wheel suitable for use with railway cars which travel at high speeds or under heavy loads.

A railway car wheel comprises a hub which is connected to an axle, a rim which rests on a rail, and a web provided between them. The rim includes a flange and a tread. This invention relates to improvements in the rim and particularly the tread thereof.

In order to increase the efficiency of railway transport, railway cars are being operated under increasing loads and at higher speeds. As a result, the operating conditions of railway cars are becoming more severe.

Due to the more severe operating conditions, in recent years, rolling contact fatigue damage of the treads of railway car wheels caused by rolling contact with rails is becoming a problem. Since the frequency with which wheels are subjected to cyclic loads due to rolling contact is higher than for rails, the extent of fatigue damage and the wear rate tend to be greater for wheels than for rails. A higher level of the rolling contact fatigue resistance as well as the wear resistance than ever is required for the wheel.

Railway car wheels undergo two types of rolling contact fatigue damage. One type is referred to as shelling, and the other is referred to as spalling. Shelling refers to damage in which micro cracks initiate in the surface of a wheel due to cyclic rolling contact, and the micro cracks propagate to result in shelling. Shelling is correlated with the hardness of a material. Namely, resistance to shelling increases with hardness. Spalling refers to damage which initiates in an as-quenched martensite layer referred to as a white layer.

A white layer is formed at the time of rapid heating and rapid cooling of the surface of a wheel which is undergoing rolling. A white layer has a hard and brittle as-quenched martensite structure, so cracks initiate in an early stage and can easily lead to spalling. In order to prevent the initiation of cracks from a white layer, it is necessary to lower the hardness of the white layer. Since the hardness of a white layer, i.e., of as-quenched martensite is determined by the C content, lowering the C content is effective at increasing the resistance to spalling.

Conventionally, a high carbon steel has been used as a material for railway car wheels on account of its excellent wear resistance. Heat treatment of wheels made of high carbon steel has been carried out so as to give the treads of such wheels a pearlite structure. For example, Japanese Published Unexamined Patent Application 2000-345295 discloses a railway car wheel in which the tread and the flange have a pearlite structure with a prescribed C content and a prescribed hardness so as to attain a balance between wear resistance and shelling resistance. However, because this wheel has a pearlite structure, its C content is high, and its resistance to spalling is only of the same order as that of a conventional wheel.

Unfortunately, if the C content is simply lowered in order to improve spalling resistance, wear resistance and shelling resistance end up decreasing.

In this manner, with conventional railway car wheels, shelling resistance and spalling resistance could not be simultaneously increased, and their resistance to rolling contact fatigue ended up being poor. Thus, they could not cope with the recent trend toward higher speeds and higher loads of railway cars.

SUMMARY OF THE INVENTION

The present invention provides a railway car wheel having a long fatigue life which can maintain the same wear resistance as a conventional wheel while simultaneously increasing resistance to shelling and resistance to spalling so as to cope with the trend towards higher speeds and heavier loads of railway cars.

As stated above, there is a correlation between resistance to shelling and hardness, and it is possible to increase resistance to shelling by increasing hardness. On the other hand, there is a correlation between resistance to spalling and the C content, and it is possible to increase resistance to spalling by lowering the C content and decreasing the hardness of a white layer.

Accordingly, the inventors of the present invention conceived that in order to simultaneously improve resistance to shelling and resistance to spalling, it is effective to increase the hardness of a material forming a railway car wheel by employing a lower than conventional C content.

A conventional railway car wheel is made of high carbon steel with a pearlite structure. The present inventors found that by employing a bainite or tempered martensite structure, the hardness of a wheel can be increased using a lower C content than with a pearlite structure. However, if the C content is made too low, a sufficient hardness cannot be obtained, and wear resistance is markedly decreased. Conversely, if the C content is not low enough, resistance to spalling is not increased.

The present inventors performed heat treatment, wear tests, and fatigue tests under various conditions on small test pieces with the object of obtaining a bainite or tempered martensite structure which can simultaneously improve shelling resistance and spalling resistance while having a wear resistance equal to that of a conventional railway car wheel. As a result of these investigations, they made the following discoveries.

(a) By using a bainite or tempered martensite structure, it is possible to increase hardness and thereby improve shelling resistance using a lower C content than with a conventional pearlite structure.

(b) With a bainite or tempered martensite structure having a lower C content than does a pearlite structure, since the hardness of a white layer is decreased, spalling resistance is increased.

(c) With a bainite or tempered martensite structure, for a given hardness, wear resistance increases as the C content increases.

The present invention was completed based on the above-described findings. According to the present invention, a railway car wheel comprising a hub, a rim having a flange and a tread portion, and a web provided between them is provided, in which the tread portion comprises a steel containing 0.35-0.55 mass % of C, having a Vickers hardness of at least 360, and having a bainite structure, a tempered martensite structure, or a mixture of a bainite and tempered martensite structure.

In another aspect, the present invention is a railway car wheel comprises a steel having a steel composition consisting essentially of, in mass percent, C: 0.35-0.55%, Si: 0.10-0.60%, Mn: 0.40-0.80%, Cr: 0.50-1.50%, Mo: 0.20-0.60%, P: at most 0.03%, S: at most 0.03%, Sol. Al: 0.005-0.10%, N: at most 0.02%, and a remainder of iron and impurities, the wheel including a hub, a rim having a flange and a tread portion, and a web provided between them. The tread portion has a Vickers hardness of at least 360 and comprises a bainite structure, a tempered martensite structure, or a mixture of a bainite and tempered martensite structure.

In a preferred mode of the present invention, the steel composition may further contain, in mass percent, (i) at least one of V: 0.005-0.30%, Nb: 0.005-0.30%, and Ti: 0.005-0.30%, and/or (ii) at least one of Ni: 0.05-1.0% and Cu: 0.05-1.0%.

A railway car wheel according to the present invention has excellent shelling resistance and spalling resistance, and its wear resistance is equal to that of a conventional wheel. A railway car wheel, therefore, can cope with the trend towards higher speeds and heavier loads of railway cars, and it can be used for long periods.

DESCRIPTION OF PREFERRED EMBODIMENTS

The present invention will be described in further detail in connection with preferred embodiments. In the following description, the contents of chemical components are all expressed in mass percent.

Figure 1:
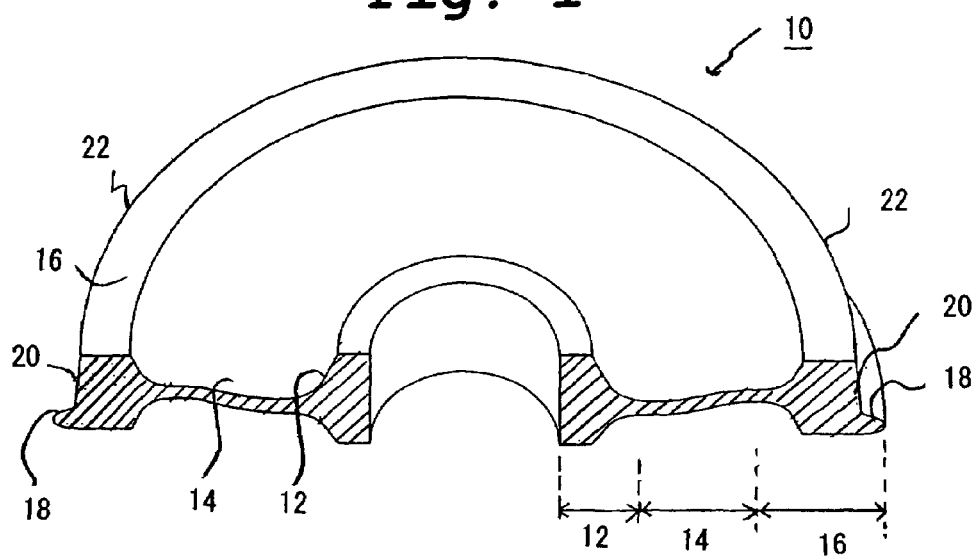
FIG. 1 is a schematic perspective view of a ½ railway car wheel.

FIG. 1 is a schematic perspective view of a ½ portion of a typical railway car wheel 10 comprising a hub 12, a rim 16, and a web 14 provided between them. The rim 16 includes a flange 18 and a tread portion 20. The rim 16 can be connected to an unillustrated axle of a railway car by a hub 12 and a web 14. The tread portion 20 is the region of the rim 16 extending inwards from the tread surface 22. It is generally sufficient for the tread portion 20 to have a thickness on the order of a few millimeters as measured from the tread surface 22 because shelling or spalling usually occurs in a region extending to a depth of a few millimeters from the tread surface 22. This region is prepared to have a specific carbon content and steel structure as well as a specific hardness in accordance with the present invention. However, in order to increase the fatigue life of the tread portion 20 until the occurrence of shelling or spalling with greater certainty, as described below, it is desirable for the tread portion 20 to extend from the tread surface 22 to a depth of at least 10 mm as measured from the tread surface 22. Taking into consideration wear of the wheel, it is still more desirable for the tread portion 20 to extend from the tread surface 22 to a depth of least 40 mm as measured from the tread surface 22.

The tread portion 20 of a wheel according to the present invention has a C content of 0.35-0.55%, a Vickers hardness of at least 360, and a structure which is bainite, tempered martensite, or a mixture of bainite and tempered martensite.

Figure 2:
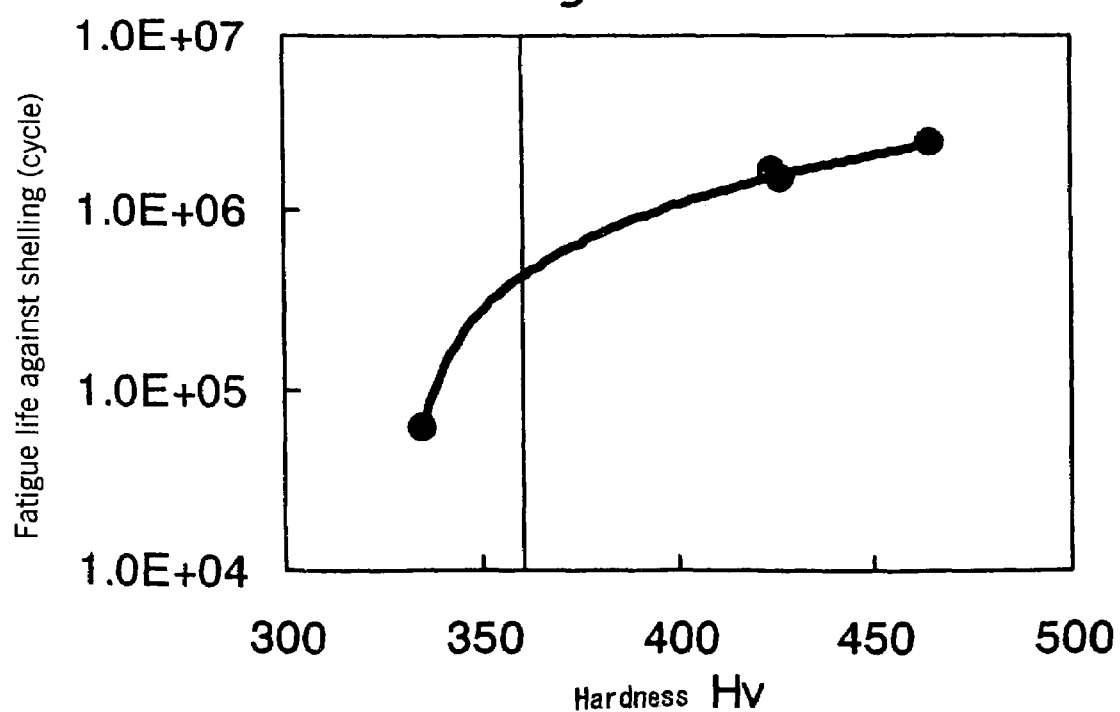
FIG. 2 is a graph showing the relationship between the fatigue life of a steel test piece until the occurrence of shelling and the hardness of the test piece.

FIG. 2 is a graph of the fatigue life until the occurrence of shelling as a function of Vickers hardness for test pieces taken from wheels according to the present invention (Run Nos. 1-3 of Example 1) and a comparative wheel (comparative Example 1) having the properties shown in below-described Tables 1-3. It can be seen from FIG. 2 that there is a correlation between the surface hardness and shelling resistance of a railway car wheel.

The reason why the structure of the tread portion of a railway car wheel according to the present invention is made bainite, tempered martensite, or a mixture of bainite and tempered martensite having a Vickers hardness of at least 360 is because, as shown in FIG. 2, the fatigue life of a tread portion until the occurrence of shelling is greatly increased when the Vickers hardness is at least 360.

Furthermore, in order to guarantee sufficient shelling resistance, it is preferable to make the Vickers hardness of the tread portion at least 390. However, if the hardness of the tread portion is raised too much, toughness decreases and working becomes difficult, so the Vickers hardness of the tread portion is preferably made at most 550.

A uniform bainite structure is desirable because it can exhibit superior toughness and because temper brittleness does not occur.

Here, tempered martensite collectively refer to all materials in which as-quenched martensite which was quenched by water cooling or oil cooling is tempered in the range of approximately 200-700° C.

Taking wear into consideration, the tread portion in which the above-described hardness and structure are maintained preferably extends from the tread surface 22 to a depth of at least 10 mm and more preferably to a depth of at least 40 mm as measured from the tread surface 22.

In a railway car wheel according to the present invention, C is an indispensable element for obtaining a prescribed hardness. In addition, it greatly affects wear resistance. If the C content is less than 0.35%, adequate wear resistance is not obtained, and if it is greater than 0.55%, the hardness of a white layer cannot be adequately reduced and resistance to spalling is not increased. Therefore, in the present invention, the C content of the tread portion of a wheel is made 0.35-0.55%.

Figure 3:
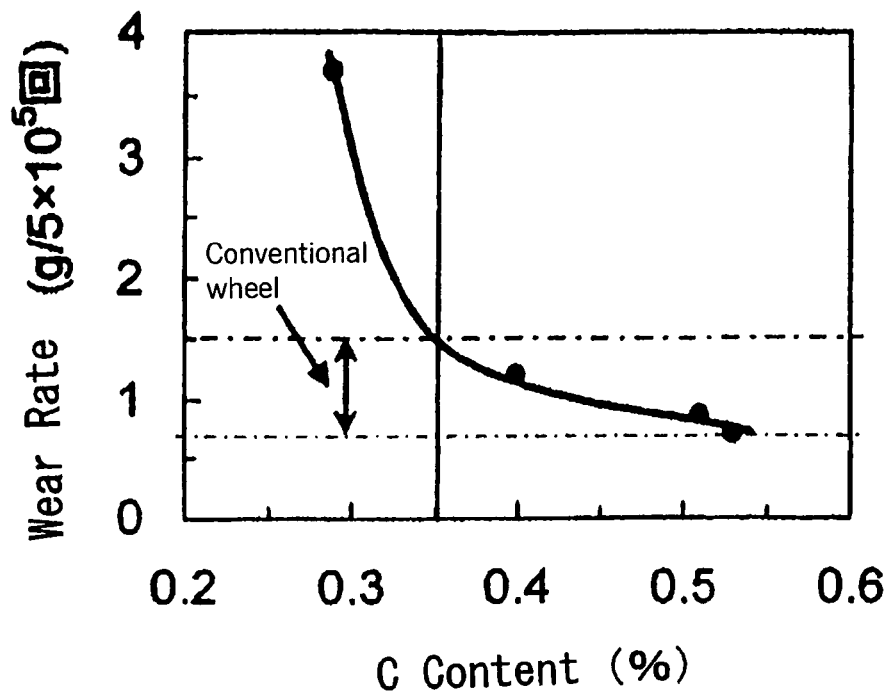
FIG. 3 is a graph showing the relationship between the amount of wear and the C content of a steel test piece.

FIG. 3 shows the relationship between the amount of wear in a wear test and the C content of test pieces taken from various railway car wheels. The data in FIG. 3 are taken from Table 9, which shows the results for below-described Example 3. From FIG. 3, it can be seen that the same wear resistance as for a conventional wheel is obtained when the C content is at least 0.35%. In order to obtain a still more satisfactory wear resistance, the C content is preferably made at least 0.40%.

The reason why wear resistance increases as the C content increases is because the higher is the C content, the greater is the amount of carbides dispersed in the matrix, and as a result, amount of wear reduces. Accordingly, the greater the percent of area occupied by carbides in an arbitrary cross section of the tread portion and the greater the size of each carbide, the more wear resistance is increased. However, if the percent of area occupied by carbides becomes too great or if the size of each carbide grain becomes too great, toughness ends up decreasing. Therefore, in the tread portion, the percent of area occupied by carbides is preferably 3.0-20.0%, and the length of each carbide grain in the tread portion is preferably 0.1-3.0 micrometers.

Figure 4:
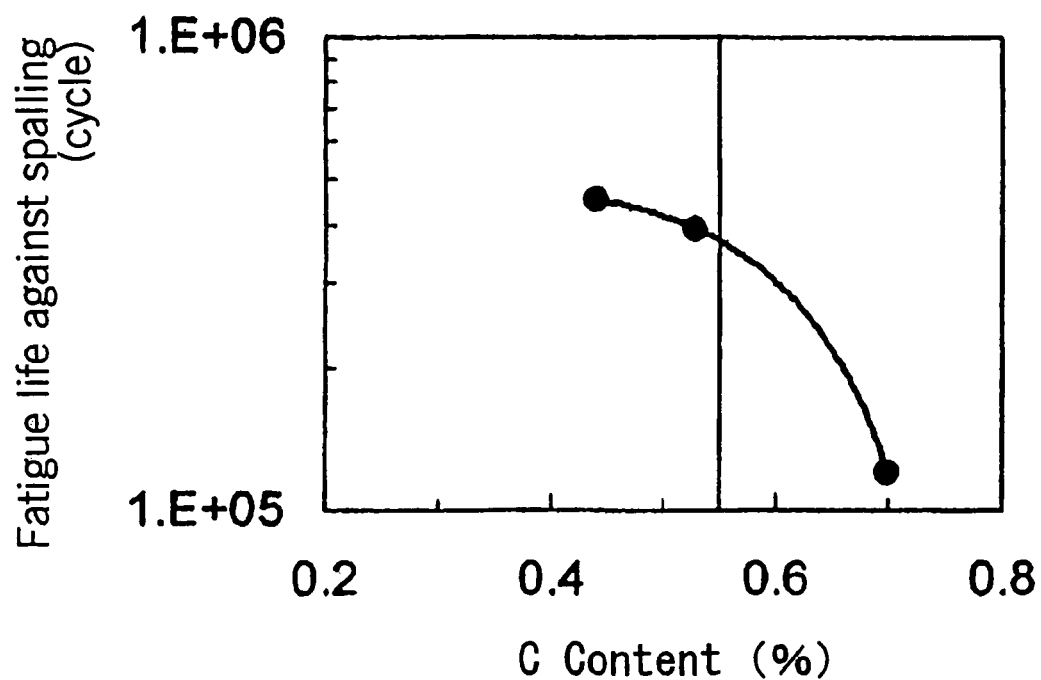
FIG. 4 is a graph showing the relationship between the fatigue life of a white layer until the occurrence of spalling and its C content.

FIG. 4 shows the relationship between the fatigue life of a white layer until the occurrence of spalling and the C content of test pieces taken from various railway car wheels based on data in Table 6 showing the results for below-described Example 2. It can be seen that the fatigue life of a white layer until the occurrence of spalling markedly decreases when the C content is greater than 0.55%. The C content is preferably at most 0.50% in order to guarantee adequate spalling resistance.

There is no particular restriction on the structure of the flange of a wheel according to the present invention. For example, it may have the same structure as the tread portion, or it may have a pearlite structure, as in a conventional railway car wheel. However, from the standpoint of ease of manufacture, it preferably has the same structure as the tread portion.

In order for a wheel according to the present invention to adequately exhibit desired properties, chemical components other than C are preferably limited as described below.

Si: 0.10-0.60%

Si is an element which performs deoxidizing of molten steel. If its content is less than 0.10%, inadequate deoxidizing takes place, and defects such as blow holes occur. On the other hand, if its content exceeds 0.60%, problems such as surface defects at the time of manufacture and a decrease in toughness occur. In order for Si to more adequately exhibit its properties, its content is preferably made 0.20-0.40%.

Mn: 0.40-0.80%

Mn is an element which increases hardenability and hardness. If the content of Mn is less than 0.40%, the increase in hardness which is obtained is not sufficient, and if its content is greater than 0.80%, machinability decreases and it becomes difficult to perform working on a wheel. In order for Mn to more adequately exhibit its effects, its content is preferably made 0.50-0.70%.

Cr: 0.50-1.50%

Cr is an important element for increasing hardenability and for finely dispersing carbides in a matrix to guarantee strength. If the Cr content is less than 0.50%, hardenability becomes inadequate and a mixed structure of ferrite and pearlite results. If the Cr content exceeds 1.50%, a decrease in toughness is caused due to coarsening of carbides. In order to more stably obtain a bainite-tempered martensite structure having a high toughness, the Cr content is preferably made 0.70-1.20%.

Mo: 0.20-0.60%

Mo is an element which is necessary to increase hardenability and to stabilize a bainite or tempered martensite structure. If the Mo content is less than 0.20%, the effects thereof are not adequate. Preferably the content thereof is at least 0.30%. Mo is an expensive element, and costs become excessive if its content is greater than 0.60%.

P: at most 0.03%

P decreases toughness, so its content is limited to at most 0.03%, and preferably at most 0.01%.

S: at most 0.03%

S is present in steel primarily in the form of inclusions. If the content thereof exceeds 0.03%, the amount of inclusions increase and toughness decreases, so its content is limited to at most 0.03% and more preferably at most 0.01%.

Sol. Al: 0.005-0.10%

Al is a material which functions as a deoxidizing agent and which has the effect of increasing toughness. However, these effects are not adequate if its content is less than 0.005%, whereas its effects saturate if its content exceeds 0.10%, and toughness ends up decreasing due to an increase in nonmetallic inclusions. Preferably the Al content is made 0.02-0.07%.

N: at most 0.02%

N bonds with Al to form AlN and has the effect of refining crystal grains, so it may be included if desired. However, its effect saturates at a content of 0.02%, so the upper limit on its content is preferably made 0.02%. More preferably the content thereof is 0.004-0.015%.

V: 0.005-0.30%

Nb: 0.005-0.30%

Ti: 0.005-0.30%

At least one of these elements is preferably added.

V, Nb, and Ti bond with C in the matrix and precipitate after rolling, and they increase hardness by precipitation strengthening. In addition, they can increase resistance to spalling by reducing the content of C at the time of rapid heating due to wheel sliding and by decreasing the hardness of a white layer. For any of these elements, if its content is lower than 0.005%, the effect which it provides is inadequate, whereas if its content is greater than 0.30%, its effect saturates, and in addition, it may lead to a decrease in toughness due to coarsening of carbides. The content of any of V, Nb, and Ti which is added is preferably 0.05-0.25% each.

Ni: 0.05-1.0%

Cu: 0.05-1.0%

At least one of these elements is preferably added.

Each of Ni and Cu is an element which dissolves in the matrix to increase hardenability and increase hardness. For either of these elements which is added, if its content is smaller than 0.05%, its effects are not adequate, and if its content exceeds 1.0%, it becomes easy for surface defects to develop during manufacture. Preferably the content of any of Ni and Cu which is added is 0.20-0.60% each.

When manufacturing a wheel according to the present invention, it is preferable to employ vacuum degasification treatment such as the R-H process and continuous casting on account of their excellent cleanliness and ability to perform manufacture with good efficiency. In addition, it is preferable to conduct forming by forging and rolling on account of the excellent strength and toughness which they provide.

Subsequently, heat treatment of the tread portion is preferably carried out to obtain a desired structure. As a heat treatment method, it is possible to employ quenching of the tread portion with cooling water, for example.

Figure 5:
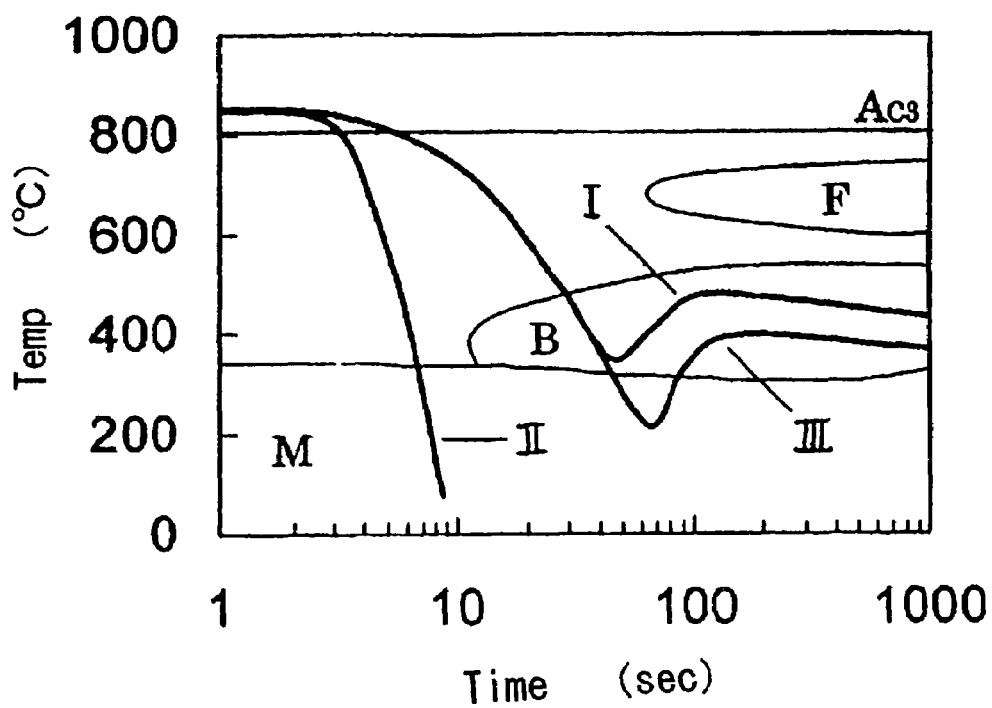
FIG. 5 is a CCT diagram on which are plotted continuous cooling curves for heat treatment of a wheel according to the present invention.

FIG. 5 schematically shows a CCT diagram and three continuous cooling curves (I-III) illustrating different quenching patterns. In this figure, B indicates bainite, M indicates martensite, and F indicates ferrite.

Cooling curve I in FIG. 5 illustrates heat treatment which can obtain a uniform bainite structure by quenching with cooling water to the bainite transformation region, stopping the cooling water just above the Ms point, and then allowing the material being treated to cool to room temperature. In some cases, it is possible to carry out tempering at a fixed temperature to adjust the hardness or increase toughness.

Cooling curve II illustrates cooling in which the supply of cooling water is higher than for cooling curve I, so quenching to room temperature is carried out at a high cooling rate, and a completely martensitic structure is obtained without passing through a bainite transformation region. If tempering is carried out so as to obtain the necessary hardness, a uniform tempered martensite structure is obtained.

Cooling curve III has the same cooling speed as does cooling curve I, but the supply of cooling water is stopped at or below the Ms point, and a martensite structure is partially formed. Reascension of temperature to follow causes the same temperature history as with tempering, and a structure which is a mixture of bainite and tempered martensite is obtained. After the material being treated is allowed to cool to room temperature, its hardness can be adjusted and its toughness can be increased by performing tempering at a fixed temperature in the same manner as with cooling curve I.

Instead of performing continuous cooling like that described above, it is also possible to obtain a bainite structure by isothermal transformation.

Figure 6:
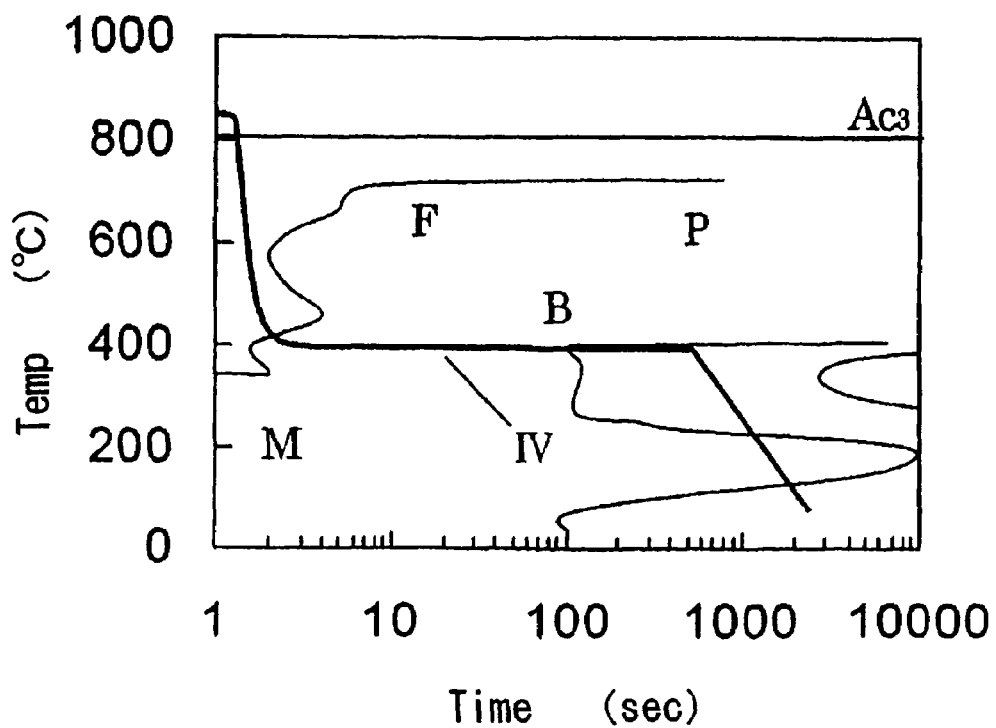
FIG. 6 is a TTT diagram on which is plotted an isothermal transformation curve for heat treatment of a wheel according to the present invention.

FIG. 6 shows a typical TTT diagram and an isothermal transformation curve. In this figure, B indicates bainite, M indicates martensite, F indicates ferrite, and P indicates pearlite.

With transformation curve IV, holding is performed in the temperature region for a bainite transformation until the transformation is complete, resulting in a uniform bainite structure. If holding is performed at a temperature which is slightly higher than transformation curve IV, a bainite structure having a somewhat reduced hardness is obtained, and if holding is performed at a slightly lower temperature, a bainite structure having a somewhat higher hardness is obtained.

An example of a method which can be used to carry out such an isothermal transformation is one in which a salt bath furnace into which one or more wheels can be placed is prepared, a wheel which was heated to the austenitizing temperature region is immersed in the salt bath furnace, which was heated to a temperature for isothermal transformation, and the wheel is held in the furnace until transformation is complete.

Such heat treatment usually results in the tread portion and the flange having the same structure, but if necessary, local heat treatment can be performed on just the tread portion, for example, to give just the tread portion a desired structure, and the flange may be given a pearlite structure as with a conventional wheel.

Next, the operation and effects of the present invention will be explained more specifically by examples.

EXAMPLE 1

Railway car wheels having the steel compositions and structures shown in Tables 1 and 2 were manufactured by forging and rolling. Heat treatment of the wheels was carried out by continuous cooling (cooling curve I or III). A test piece including the tread surface was cut from each of the resulting wheels. The chemical components, structure, and Vickers hardness of the test pieces used for evaluating resistance to shelling are shown in Tables 1 and 2.

TABLE 2

|  |  | Structure | Hardness Hv |
|---|---|---|---|
| Wheels of Present Invention | 1 | bainite + tempered martensite | 425 |
|  | 2 | bainite | 427 |
|  | 3 | bainite | 465 |
| Comparative Wheels | 1 | pearlite | 334 |
|  | 2 | pearlite | 340 |
|  | 3 | bainite | 336 |

Resistance to shelling was evaluated by performing a twin-disc rolling contact fatigue test. The test was carried out with water lubrication using a contact pressure of 1300 MPa and a slip rate of 0.5%. Resistance to shelling was evaluated by the fatigue life until the occurrence of shelling on the surface of the test piece. The fatigue life until the occurrence of shelling for each material is shown in Table 3.

TABLE 3

|  |  | Fatigue life until occurrence of shelling (cycles) |
|---|---|---|
| Wheels of Present Invention | 1 | $166 \times 10^4$ |
|  | 2 | $149 \times 10^4$ |
|  | 3 | $238 \times 10^4$ |
| Comparative Wheels | 1 | $88 \times 10^4$ |
|  | 2 | $77 \times 10^4$ |
|  | 3 | $6 \times 10^4$ |

From Table 3, it can be seen that because the test pieces taken from wheels according to the present invention had either a bainite, a tempered martensite, or a mixed bainite and tempered martensite structure, each having a Vickers hardness of at least 360, the fatigue life until the occurrence of shelling was increased compared to Comparative Wheels 1 and 2 which are conventional wheels. It can also be seen that for Comparative Wheel 3 which had a Vickers hardness of lower than 360, its fatigue life until the occurrence of shelling was considerably shorter than for the wheels of the present invention.

EXAMPLE 2

Test pieces were prepared in the same manner as in Example 1. However, heat treatment of the wheels from which the test pieces were obtained was carried out by continuous cooling (cooling curves I and II).

Tables 4 and 5 show the steel composition, structure, and Vickers hardness of the base metal of the test pieces used to evaluate spalling resistance.

TABLE 1

|  |  | Chemical composition (mass %) | | | | | | | | | | |
|---|---|---|---|---|---|---|---|---|---|---|---|---|
|  |  | C | Si | Mn | Cr | Mo | P | S | Sol. Al | N | V | Ni |
| Wheels of Present Invention | 1 | 0.35 | 0.22 | 0.53 | 0.97 | 0.40 | 0.002 | 0.002 | 0.038 | 0.006 | 0.230 | 0.15 |
|  | 2 | 0.40 | 0.25 | 0.59 | 1.01 | 0.42 | 0.005 | 0.002 | 0.031 | 0.007 | 0.005 | — |
|  | 3 | 0.51 | 0.25 | 0.58 | 1.00 | 0.41 | 0.001 | 0.002 | 0.026 | 0.007 | — | — |
| Compar. Wheels | 1 | 0.70 | 0.24 | 0.74 | 0.08 | — | 0.012 | 0.008 | 0.049 | 0.005 | — | — |
|  | 2 | 0.65 | 0.84 | 0.76 | 0.10 | — | 0.010 | 0.006 | 0.042 | 0.006 | — | — |
|  | 3 | 0.29 | 0.25 | 0.58 | 1.00 | 0.40 | 0.001 | 0.002 | 0.025 | 0.005 | — | — |

TABLE 4

| | | Chemical composition (mass %) | | | | | | | | | | | |
|---|---|---|---|---|---|---|---|---|---|---|---|---|---|
| | | C | Si | Mn | Cr | Mo | P | S | Sol. Al | N | V | Ni | Cu |
| Wheels of Present Invention | 4 | 0.44 | 0.24 | 0.57 | 0.96 | 0.39 | 0.006 | 0.003 | 0.030 | 0.008 | — | — | — |
| | 5 | 0.53 | 0.25 | 0.60 | 1.21 | 0.51 | 0.002 | 0.002 | 0.026 | 0.006 | 0.007 | — | — |
| Compar. Wheels | 1 | 0.70 | 0.24 | 0.74 | 0.08 | — | 0.012 | 0.008 | 0.049 | 0.005 | — | — | — |
| | 6 | 0.70 | 1.94 | 0.67 | 0.95 | — | 0.001 | 0.004 | 0.01 | 0.002 | — | 0.02 | 0.02 |

TABLE 5

| | | Structure | Hardness Hv |
|---|---|---|---|
| Wheels of Present Invention | 4 | bainite | 423 |
| | 5 | tempered martensite | 415 |
| Comparative Wheels | 1 | pearlite | 334 |
| | 6 | bainite | 421 |

Resistance to spalling was evaluated by performing a twin-disc rolling contact fatigue test using a test piece on which a white layer was previously generated by a YAG laser heating. The test was carried out without dry condition using a contact pressure of 1300 MPa and a slip rate of 0.3%. The resistance to spalling in the test was evaluated by taking the number of cycles until cracks initiated in the white layer as the fatigue life until the occurrence of spalling. The fatigue life until the occurrence of spalling of the white layer of each test piece and the hardness of each white layer are shown in Table 6.

TABLE 6

| | | Fatigue life until occurrence of spalling (cycles) | Hardness of white layer Hv |
|---|---|---|---|
| Wheels of Present Invention | 4 | $45 \times 10^4$ | 723 |
| | 5 | $39 \times 10^4$ | 764 |
| Comparative Wheels | 1 | $12 \times 10^4$ | 886 |
| | 6 | $15 \times 10^4$ | 878 |

From Table 6, it can be seen that wheels according to the present invention having a C content of at most 0.55% had a white layer with a lower hardness than the comparative wheels having a C content of 0.7%, and the fatigue life until the occurrence of spalling was greatly increased.

EXAMPLE 3

Test pieces were obtained in the same manner as in Example 1.

Tables 7 and 8 show the chemical composition, structure, and Vickers hardness of the test pieces used to evaluate wear resistance.

TABLE 7

| | | Chemical composition (mass %) | | | | | | | | | |
|---|---|---|---|---|---|---|---|---|---|---|---|
| | | C | Si | Mn | Cr | Mo | P | S | Sol. Al | N | V |
| Wheels of Present Invention | 6 | 0.38 | 0.25 | 0.60 | 1.01 | 0.41 | 0.001 | 0.001 | 0.027 | 0.005 | — |
| | 7 | 0.51 | 0.25 | 0.58 | 1.00 | 0.41 | 0.001 | 0.002 | 0.026 | 0.007 | — |
| | 8 | 0.53 | 0.25 | 0.60 | 1.21 | 0.51 | 0.002 | 0.002 | 0.026 | 0.006 | 0.007 |
| Compar. Wheels | 1 | 0.70 | 0.24 | 0.74 | 0.08 | — | 0.012 | 0.008 | 0.049 | 0.005 | — |
| | 4 | 0.61 | 0.25 | 0.79 | 0.12 | — | 0.010 | 0.007 | 0.031 | 0.006 | — |
| | 5 | 0.29 | 0.25 | 0.58 | 1.00 | 0.40 | 0.001 | 0.002 | 0.025 | 0.005 | — |

TABLE 8

| | | Structure | Hardness Hv |
|---|---|---|---|
| Wheels of Present Invention | 6 | bainite | 442 |
| | 7 | bainite | 400 |
| | 8 | bainite | 400 |
| Comparative Wheels | 1 | pearlite | 334 |
| | 4 | pearlite | 290 |
| | 5 | bainite | 378 |

Wear resistance was evaluated by a Nishihara's wear test. A Nishihara's wear test is a test which is carried out by rolling contact with twin disc. This test was carried out with dry condition using a contact pressure of 2200 MPa and a slip rate of 3.0%. Table 9 shows the results for wheels of the present invention and comparative wheels. The amount of wear was the decrease in weight after $5 \times 10^5$ cycles.

TABLE 9

| | | Amount of wear (g) |
|---|---|---|
| Wheels of Present Invention | 6 | 1.19 |
| | 7 | 0.87 |
| | 8 | 0.69 |

TABLE 9-continued

|  |  | Amount of wear (g) |
|---|---|---|
| Comparative Wheels | 1 | 0.72 |
|  | 4 | 1.54 |
|  | 5 | 3.69 |

From Table 9, it can be seen that each of the wheels according to the present invention had a C content of at least 0.35% and a Vickers hardness of at least 360, so the amount of wear was nearly the same as for Comparative Wheels 1 and 4 which were taken from conventional wheels.

As described above, a railway car wheel according to the present invention has excellent resistance to shelling and spalling, and its wear resistance is equal to that of a conventional wheel, so it provides the unexpected results that it can be used for long periods.

What is claimed is:

1. A railway car wheel formed by forging and rolling and having a steel composition consisting of, in mass percent, C: 0.40-0.55%, Si: 0.20-0.40%, Mn: 0.40-0.80%, Cr: 0.50-1.50%, Mo: 0.30-0.60%, P: at most 0.03%, S: at most 0.03%, Sol. Al: 0.005-0.10%, N: at most 0.02%, and a remainder of iron and impurities, and comprising a hub, a rim, and a web, the rim having a flange and a tread portion, the tread portion having a Vickers hardness of at least 390 and comprising a bainitic structure, a tempered martensite structure, or a mixture of a bainite and tempered martensite structure.

2. A railway car wheel as claimed in claim 1 wherein the tread portion extends from a tread surface of the tread portion to a depth of at least 10 mm from the tread surface.

3. A railway car wheel as claimed in claim 1 wherein the Vickers hardness of the tread portion is at least 390 and at most 550.

4. A railway car wheel as claimed in claim 1 wherein the C content of the tread portion is at least 0.40 mass % and at most 0.50 mass %.

5. A railway car wheel formed by forging and rolling and having a steel composition consisting of, in mass percent, C: 0.40-0.55%, Si: 0.20-0.40%, Mn: 0.40-0.80%, Cr: 0.50-1.50%, Mo: 0.30-0.60%, P: at most 0.03%, S: at most 0.03%, Sol. Al: 0.005-0.10%, N: at most 0.02%, at least one of V: 0.005-0.30%, and Nb: 0.005-0.30%, and Ti: 0.005-0.30%, and a remainder of iron and impurities, and comprising a hub, a rim, and a web, the rim having a flange and a tread portion, the tread portion having a Vickers hardness of at least 390 and comprising a bainitic structure, a tempered martensite structure, or a mixture of a bainite and tempered martensite structure.

6. A railway car wheel as claimed in claim 5 wherein the tread portion extends from a tread surface of the tread portion to a depth of at least 10 mm from the tread surface.

7. A railway car wheel as claimed in claim 5 wherein the Vickers hardness of the tread portion is at least 390 and at most 550.

8. A railway car wheel as claimed in claim 5 wherein the C content of tread portion is at least 0.40 mass % and at most 0.50 mass %.

* * * * *